United States Patent [19]

Romann et al.

[11] 4,299,125
[45] Nov. 10, 1981

[54] AIR QUANTITY METERING APPARATUS

[75] Inventors: Peter Romann, Stuttgart; Udo Hafner, Lorch, both of Fed. Rep. of Germany

[73] Assignee: Robert Bosch GmbH, Stuttgart, Fed. Rep. of Germany

[21] Appl. No.: 177,340

[22] Filed: Aug. 12, 1980

Related U.S. Application Data

[63] Continuation of Ser. No. 15,994, Feb. 28, 1979, abandoned.

[30] Foreign Application Priority Data

Mar. 4, 1978 [DE] Fed. Rep. of Germany ....... 2809455

[51] Int. Cl.³ .............................................. G01F 1/68
[52] U.S. Cl. .................................................... 73/204
[58] Field of Search ..................... 73/204, 346, 27 R; 338/25, 318

[56] References Cited

U.S. PATENT DOCUMENTS

| | | | |
|---|---|---|---|
| 1,156,630 | 10/1915 | Savage ................................. | 73/204 |
| 3,732,722 | 5/1973 | Norem et al. ....................... | 73/15 B |
| 4,074,566 | 2/1978 | Obayashi et al. ................. | 73/204 X |
| 4,109,510 | 8/1978 | Rodder ............................. | 73/204 X |

Primary Examiner—James J. Gill
Attorney, Agent, or Firm—Edwin E. Greigg

[57] ABSTRACT

An apparatus is proposed for metering air quantity, particularly for metering induction air quantity in internal combustion engines, which has a temperature-dependent resistor disposed within an air stream, the temperature and/or resistance value of which is regulated in accordance with the air quantity, and with the control value providing a standard for induction air quantity. The temperature-dependent resistor is embodied as a heating wire and is stretched in a V-shape on a carrier member, whereby the temperature coefficient of the carrier member and that of the heating wire are compatible with each other. The stretching of the wire is accomplished with the aid of support elements which are fixed within the carrier member. The heating wire has each end affixed at a support point, while it is guided only loosely over an intermediate support element.

15 Claims, 4 Drawing Figures

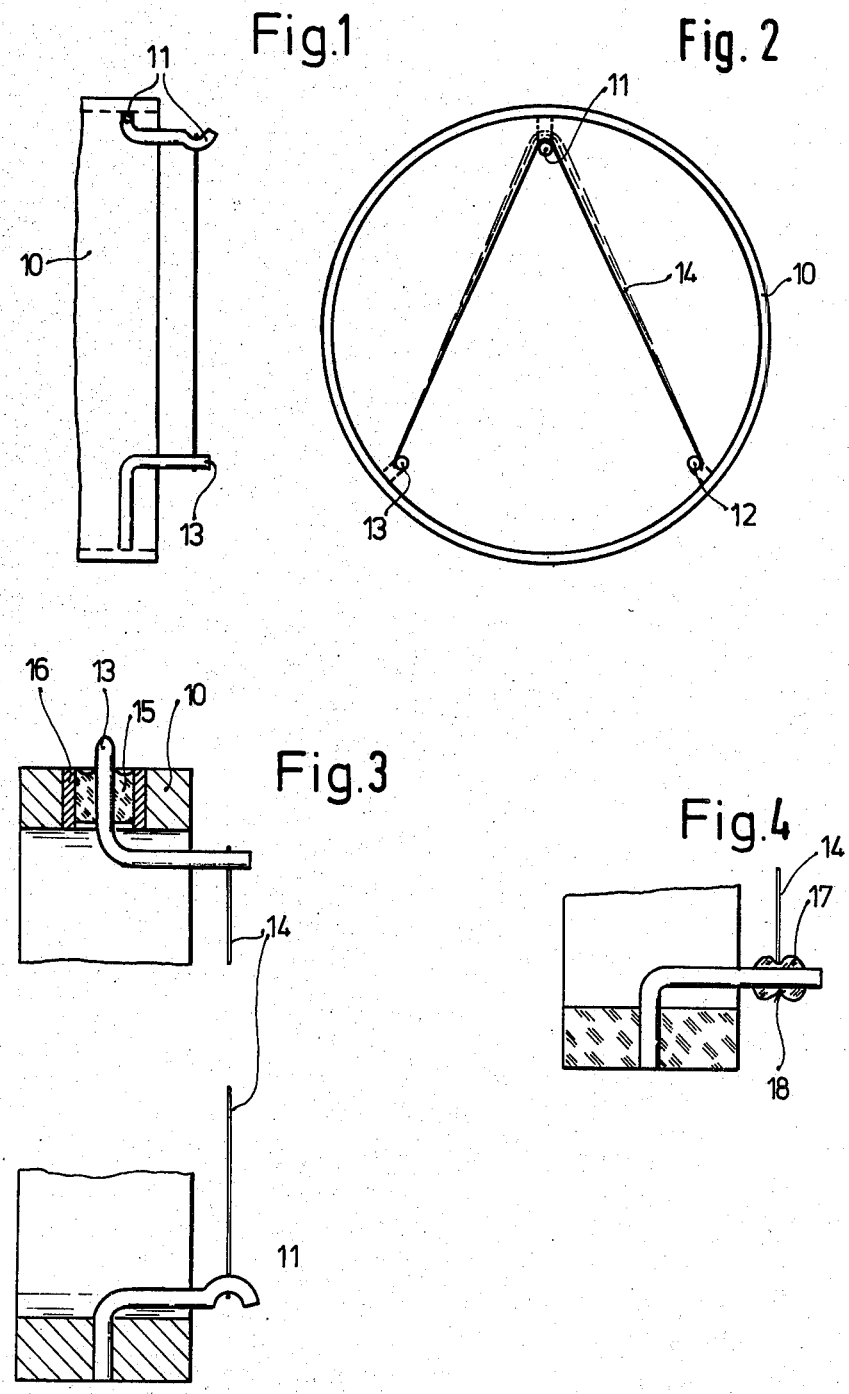

AIR QUANTITY METERING APPARATUS

This is a continuation, of application Ser. No. 15,994, filed Feb. 28, 1979, now abandoned.

CROSS-REFERENCE TO RELATED INFORMATION

This application in so far as it relates to platinum-glass material identifies a prior use of platinum-glass as found in a German publication entitled Feinmechanik u. Präzision (Precision Engineering), No. 62, Glas als Werkstoff der Vakuumtechnik, A V 10 DK 666.03, page 117 (1958).

BACKGROUND OF THE INVENTION

The invention relates to an apparatus for air quantity metering, particularly for metering the induction air quantity in internal combustion engines, having a temperature-dependent resistor element disposed within the air stream the temperature and/or resistance of which is regulated in accordance with the air quantity, and with the control value providing a standard for the air quantity. Such apparatuses are already known, in which a heating wire is utilized as a temperature-dependent resistor, which is stretched tautly between two points. Because of strong variations in temperature both in the vehicle and caused by the particular mode of operation of the wire, breakage of the wire occurs relatively quickly.

OBJECT AND SUMMARY OF THE INVENTION

The arrangement in accordance with the invention has the advantage over the prior art that temperature variations in the vehicle and those occasioned by the mode of operation of the heating wire have no influence on the life of the apparatus, and furthermore that tensile or compressive strains are not conducted to the wire, so that damage to the wire resulting from temperature changes is eliminated.

It is considered a further advantage that the wire can be stretched relatively simply, so that the air quantity metering apparatus can be produced simply and at a favorable cost.

The invention will be better understood as well as further objects and advantages thereof become more apparent from the ensuing detailed description of a preferred embodiment taken in conjunction with the drawing.

BRIEF DESCRIPTION OF THE DRAWING

FIG. 1 is a fragmentary side elevational view of the invention;

FIG. 2 is a front elevational view of the invention showing a heating wire stretched into a V-shape; FIG. 3 is a fragmentary cross-sectional view of a carrier member with the support elements for the heating wire shown in elevation; and FIG. 4 is a fragmentary view showing one support element for a medial area of said heating wire.

DESCRIPTION OF THE PREFERRED EMBODIMENT

In FIG. 1, a sensor ring or carrier member 10 is shown. This sensor ring is provided with three support elements 11, 12 and 13. With the aid of the sensor support elements 11, 12, 13, a heating wire 14 is stretched in a V-shape. The heating wire 14 has its ends fixed only at two support points 12 and 13, while it is guided only loosely over the third support point 11, this latter support point being embodied in the form of a hook.

The heating coil is suitably produced of platinum. The sensor ring 10, which serves as the carrier member for the heating wire 14, has its heat-expansion coefficient adapted to the heat-expansion coefficient of the heating wire 14, so that changes in length of the wire or of that of the sensor ring caused by heat expansion do not cause any tensile or compressive strains in the wire 14, but instead are compensated for by variations in distance between the points of support of the wire as indicated by numerals 11, 12, 13.

Stretching the wire in such a way that it is free of tensile and compressive strains is extraordinarily important if the heating coil is to be utilized as an air quantity meter in the intake manifold of a motor vehicle, for example. The temperature range which then must be considered is generally from −30° C. to +120° C. Furthermore, still another temperature variation is occasioned by the mode of operation of the heating wire 14. Frequently, the heating wire is heated further to a high temperature and made to glow, so that residues firmly deposited on its surface can be burned off. This brief elevation in temperature also causes changes in the length of the wire, which could cause tensile and compressive strains when the wire is rigidly stretched.

By means of stretching the wire in a V-shape and adapting the heat-expansion coefficients of the sensor ring 10 and of the heating wire 14 to each other, the possibility of conducting tensile or compressive strains into the heating wire 14 is eliminated. When the heating wire 14 is made of platinum, it is effective to embody the sensor ring 10 in a nickel-iron alloy, the heat-expansion coefficient of which corresponds approximately to that of platinum. It is also possible to make the sensor ring of glass, particularly of so-called platinum-glass. The heat-expansion coefficient of this glass also corresponds substantially to that of platinum, so that no tensile or compressive strains caused by temperature changes can be conducted into the heating wire 14, but rather that changes in length of the heating wire 14 can be compensated for by changes in distance between the support points 11, 12, 13, each of which is attached to the sensor ring 10.

In FIG. 3, the mounting of the heating wire 14 is clearly illustrated once more. If the sensor ring 10 is made, for example, of a nickel-iron alloy, then at least two of the support points 11, 12 and 13 must be electrically insulated from the sensor ring. As may best be seen in the upper fixation point in FIG. 3, the support 13 is soldered into the sensor ring 10 via an insulation insert 15. A solder layer is marked with the reference numeral 16. At the lower fixation point in which the support point 11 is shown, it may be seen that a support point can be directly attached to the sensor ring 10, that is, directly fixed within the sensor ring 10. The support elements 11, 12, 13 may be so disposed that the heating wire 14 is stretched within the sensor ring 10. However, it is suitable to have the support points 11, 12, 13 bent and projecting outwardly away from the front face of the sensor ring 10 in such a manner that the heating wire 14 can be stretched outside the sensor ring 10, all of which is clearly shown in FIG. 2. This has advantages relating to fabrication techniques.

In FIG. 4, a different embodiment of the central support point for the heating wire 14 is illustrated. The central support point, over which the heating wire 14 is guided only loosely, has an insulation layer 17, which may be, for example, of glass. Within the glass layer there is a depressed or constricted area 18 for the purpose of better guiding the heating wire 14. The particular guidance of the heating wire 14 is therefore particularly suitable, because in this manner the metering accuracy of the air quantity metering apparatus can be increased. The wrap angle which the heating wire 14 forms at the support point 11 can change as a result of pulses in the air flowing past it. If no insulation were employed in the guidance of the heating wire, then depending on the wrap angle a resistor of indeterminate value could be switched in parallel to the heating wire 14, which could lead to an undesirable alteration of the metering product. By employing the insulation layer 17 on the central support point, no parallel resistors appear, so that the desired metering product is extraordinarily precise.

As a result of the suspension of the heating wire as described, it is possible to compensate for changes in the length of the heating wire 14 to such an extent that no tensile or compressive strains at all are conducted into the heating wire, so that a long operational life of the air quantity metering apparatus is achieved.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. An air quantity metering apparatus and particularly for metering the induction air quantity in internal combustion engines comprising a temperature-dependent resistor element disposed generally transversely within an air stream, said temperature-dependent resistor element having its temperature and/or resistance being regulated in accordance with the air quantity for indicating a control value, and with the control value providing a standard for the air quantity, said temperature-dependent resistor element being embodied as a continuous heating wire having end portions terminating at and being stretched on respective sensor carrier members, said carrier members and said heating wire each having heat expansion coefficients adapted to be compatible to each other, said carrier members including at least three hook-like support elements for guiding said heating wire, said end portions terminating and affixed to a pair of said hook-like support elements, said heating wire being supported loosely substantially medially of its affixed end portions on at least one of said hook-like support elements and said heating wire having conducting tensile or compressive strains being essentially eliminated.

2. An apparatus in accordance with claim 1, further wherein said heating wire is stretched on said carrier members to form the shape of a V.

3. An apparatus in accordance with claim 1, further wherein said heating wire is supported intermediate its length on said at least one of said hook-like support elements that consists at least partially of insulating material.

4. An apparatus in accordance with claim 1, further wherein said heating wire is supported intermediate its affixed end portions on said at least one of said hook-like support elements consisting at least partially of insulating material.

5. An apparatus in accordance with claim 1, further wherein said carrier members include planar wall portions and said heating wire is supported on said at least one of said hook-like support elements projecting beyond either of said planar wall portions.

6. An apparatus in accordance with claim 1, further wherein said heating wire is platinum.

7. An apparatus in accordance with claim 6, further wherein said platinum heating wire is supported by said at least one of each hook-like support elements affixed to said carrier members by an insulation means.

8. An apparatus in accordance with claim 1, further wherein said carrier members consists of a nickel-iron alloy.

9. An apparatus in accordance with claim 1, further wherein said carrier members is a glass body.

10. An apparatus in accordance with claim 9, further wherein said support elements are fused into said glass body.

11. An apparatus in accordance with claim 1, further wherein said carrier members is platinum-glass.

12. An apparatus in accordance with claim 1, wherein a sensor member supports said carrier members and said sensor member is subjected to flow through it again in an axial direction.

13. An apparatus in accordance with claim 12, wherein said sensor member is a ring.

14. An apparatus in accordance with claim 12, wherein the heating wire is disposed at angles between adjacent segments for providing a more efficient detection of said air flow by way of a cross-section thereof, and the heating wire segments do not influence one another.

15. An apparatus in accordance with claim 1, wherein said heating wire forms angles between adjacent segments of respective carrier members.

* * * * *